United States Patent [19]

Saidman et al.

[11] Patent Number: 5,082,142
[45] Date of Patent: Jan. 21, 1992

[54] METHOD AND APPARATUS FOR APPLYING NON-CHEMICALLY FOAMED MULTI-COMPONENT CURABLE POLYMERS

[75] Inventors: Laurence B. Saidman, Westlake; James C. Smith, Lorain, both of Ohio

[73] Assignee: Nordson Corporation, Cleveland, Ohio

[21] Appl. No.: 389,640

[22] Filed: Aug. 4, 1989

[51] Int. Cl.⁵ .............................................. B01F 3/04
[52] U.S. Cl. ....................................... 222/1; 222/136; 222/190; 222/318; 422/133; 422/225
[58] Field of Search .................... 222/1, 135, 136, 145, 222/190, 195, 318; 422/133, 135, 224, 225; 211/91, D. 26

[56] References Cited

U.S. PATENT DOCUMENTS

| | | |
|---|---|---|
| 3,043,670 | 7/1962 | Vieli ...................................... 422/133 |
| 3,105,745 | 10/1963 | Vieli .......................... 261/DIG. 126 |
| 3,239,100 | 3/1966 | Peterson . |
| 3,476,292 | 11/1969 | Joseph et al. . |
| 3,541,023 | 11/1970 | Cole III . |
| 3,563,459 | 2/1971 | Kautz . |
| 3,627,275 | 12/1971 | Gusmer ................................ 422/135 |
| 3,786,990 | 1/1974 | Hagfors . |
| 3,967,634 | 7/1976 | Scherer et al. . |
| 4,019,653 | 4/1977 | Scherer et al. . |
| 4,046,287 | 9/1977 | Hoekstra et al. . |
| 4,262,847 | 4/1981 | Stitzer et al. . |
| 4,376,172 | 3/1983 | Belangee et al. ................. 521/133 |
| 4,407,431 | 10/1983 | Hutter III ............................ 222/1 |
| 4,427,153 | 1/1984 | Schaefer . |
| 4,505,405 | 3/1985 | Kelly et al. . |
| 4,522,504 | 6/1985 | Greverath . |
| 4,548,652 | 10/1985 | Kelly et al. . |
| 4,608,398 | 8/1986 | Cobbs, Jr. et al. . |
| 4,687,641 | 8/1987 | Maeda et al. ........................ 422/133 |
| 4,703,894 | 11/1987 | Fukuta et al. . |
| 4,764,536 | 8/1988 | Proksa et al. ...................... 521/133 |
| 4,778,631 | 10/1988 | Cobbs, Jr. et al. . |
| 4,779,762 | 10/1988 | Klein et al. . |
| 4,901,925 | 2/1990 | Blake III ............................ 222/190 |
| 4,933,115 | 6/1990 | Krippl et al. ..................... 261/18.1 |

FOREIGN PATENT DOCUMENTS 226969 12/1986 European Pat. Off. .
0223519 5/1987 European Pat. Off. .

*Primary Examiner*—Michael S. Huppert
*Assistant Examiner*—Philippe Derakshani
*Attorney, Agent, or Firm*—Wood, Herron & Evans

[57] ABSTRACT

A two-component thermosetting polymer system is formed and dispensed by adding a foaming agent to one of two components of the polymer system. A solution of the foaming agent in the first component is formed in a supply tank. The foaming agent and first component solution is then mixed with a second component at a dispensing head or nozzle. By adding the foaming agent to only one of the two components and, in particular, by forming a solution of the foaming agent in the first component one is able to very carefully control the foam density of the cured end product.

11 Claims, 1 Drawing Sheet

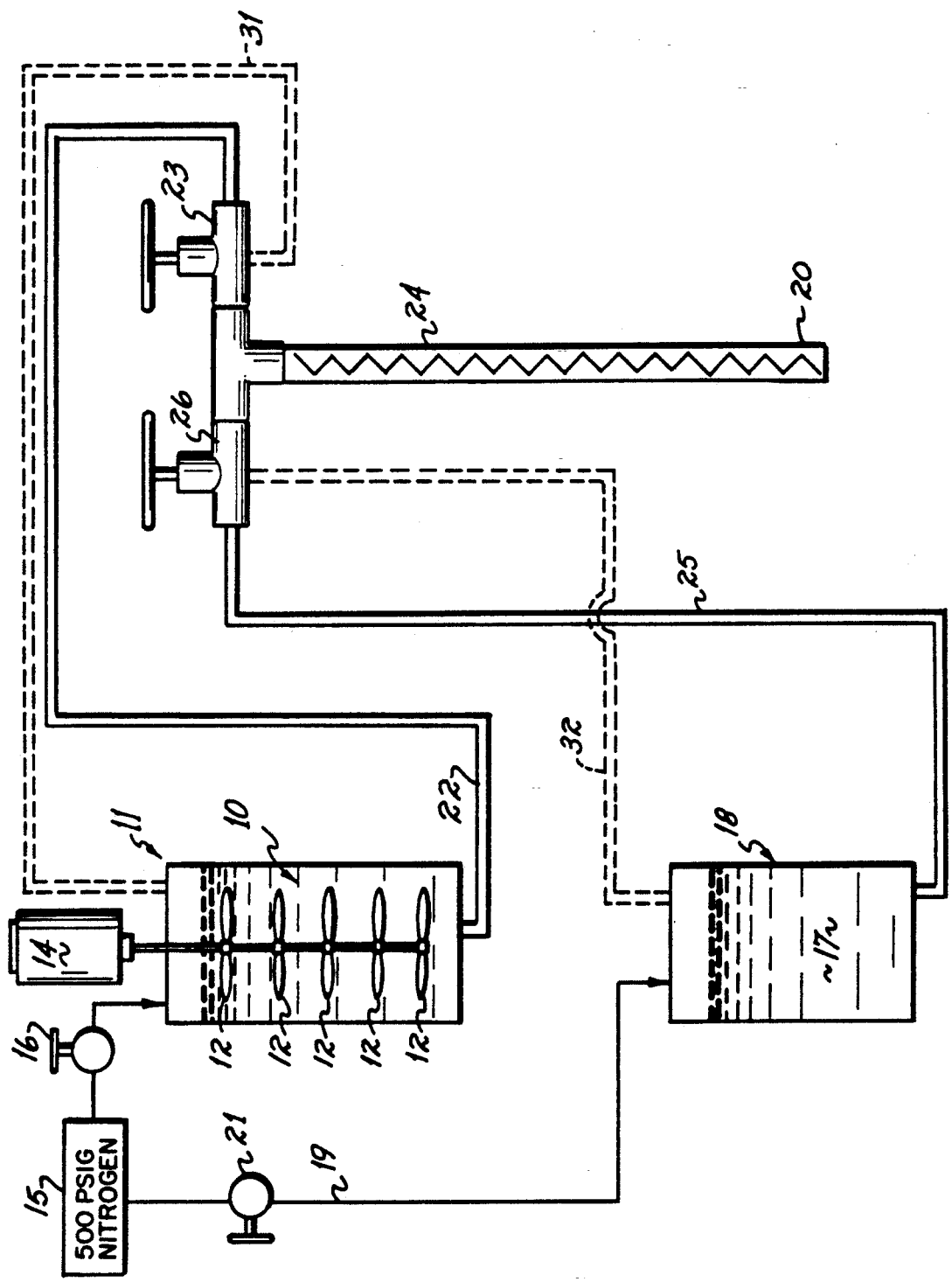

METHOD AND APPARATUS FOR APPLYING NON-CHEMICALLY FOAMED MULTI-COMPONENT CURABLE POLYMERS

Thermosettable plastics or resins are substantially infusible and insoluble. Generally, thermosetting resins are liquid at some stage in their manufacturing and are cured to form solids. The curing reaction can take place with or without catalysts and may require two or more separate reaction components as, for example, in the formation of a urethane foam where a polyol is reacted with an isocyanate. Other multi-component curable systems include certain epoxies, silicones, polyesters and the like.

In dispensing multi-component thermosettable materials, there is, of course, inherently a problem of mixing the two components and dispensing during cure. This issue has been addressed many times and there are various systems proposed to deal with this. Some of these systems are disclosed in Sherer et. al. U.S. Pat. No. 3,967,634; Sherer U.S. Pat. No. 4,019,653; Hoekstra et. al. U.S. Pat. No. 4,046,287; Schaefer U.S. Pat. No. 4,427,153; Fukuta U.S. Pat. No. 4,703,894; Greverath U.S. Pat. No. 4,522,504; Hagfors U.S. Pat. No. 3,786,990; Kelly U.S. Pat. No. 4,505,405 and Kelly U.S. Pat. No. 4,548,652.

There are further problems with foaming thermosetting materials, particularly multi-component systems. It has been found, for instance, that when it is attempted to foam relatively high viscosity polymeric materials such as thermosetting sealant materials having viscosities in the range of 50,000 to above 1,000,000 cps typical mixing systems are inadequate. The problem of inadequate mixing is somewhat complex. First, since the viscosity of air or the gas to be mixed into the polymer is essentially zero, and the viscosity of the polymer quite high, the mixing of the one very low viscosity material into another very high viscosity material is difficult. Second, since the viscosity of the material is quite high, there are large line losses involved in moving the material through pumps, hoses, pipes, and the like making use of a recirculation system to increase mixing unacceptable. Third, because of the problem of temperature increase of the polymeric material, as discussed below, the addition of mixing or pumping devices to the system, which impart energy to the polymer, is generally not an acceptable solution to the problem of large line losses.

Some temperature rise is tolerable with some thermoplastic resins. For thermosetting materials such as silicone RTV (room temperature vulcanizing) rubbers such temperature rise results in premature curing of the material giving it very short "open time" or even causing its setting up in the foaming equipment causing equipment stoppage. Likewise, such temperature rise can cause degradation of the polymer depending on its chemical structure or premature foaming in the system because of the increase in vapor pressure of the gas with temperature increase.

The need to add a blowing agent and control the degree of foaming during cure is also critical. Two patents that disclose foaming thermosettable materials are Cobbs et. al. U.S. Pat. No. 4,608,398 and Cobbs U.S. Pat. No. 4,778,631. The '398 patent discloses a system wherein foam is chemically generated by the reaction of a two-component thermoset resin system. The '631 patent discloses a continuous apparatus adapted for foaming single component resins.

There are of course other systems which disclose foaming thermosetting materials such as Peterson U.S. Pat. No. 3,239,100. This patent, specifically directed at chemically foamed urethane foam and discloses mixing liquid freon with one component of a two component system. Joseph U.S. Pat. No. 3,476,292 discloses a method of applying a foamed polyurethane wherein the foam is chemically generated and liquid freon can be introduced to increase the foam generation. Such chemical foaming systems are expensive and it is difficult to control the foam ratio. Also these systems tend to require extra clean up. Kautz U.S. Pat. No. 3,563,459 and Cole U.S. Pat. No. 3,541,023 are also directed at polyurethane foams. Stitzer U.S. Pat. No. 4,262,847 discloses addition of air to a urethane system at the gun to improve mixing and nucleation. Again, the chemistry of the urethane reaction provides in situ generation of carbon dioxide which is the primary foaming agent.

It is difficult to control the curing reaction using prior art methods, especially in an in-line or continuous system. Therefore, curable polymers set up in tanks causing waste, and a need for clean up devices and extra labor. Startup and shutdown of equipment decreases efficiency. Sometimes, set up in equipment causes damage to the equipment itself. These difficulties also exist when chemically foaming curable compositions. Workers in the art have developed chemical foaming agents to overcome some of these problems, but these offer virtually no control over foaming where intermittent dispensing is required.

SUMMARY OF THE INVENTION

The present invention is premised upon the realization that non-chemically foamed multi-component curable resins or polymers can be foamed and dispensed by providing a source of supply for each component of the thermosetting polymer and introducing a foaming agent into one component of the multi-component system. The foaming agent is added to the bulk supply of the first component and a solution of the agent in that component is formed. The first component with the foaming agent is then mixed with a second component immediately prior to or at a dispensing nozzle. The mixture of the components and the foaming agent is then dispensed to form a cured foamed material.

This method provides for very controlled foaming which permits multi-component curable systems to be used for many new applications such as sealants for auto bodies where precise bead size and foam ratios are extremely important. The method is also very suitable in applications for foaming thermosetting compositions in-line or continuously. Prior art problems of polymer set up in tanks, decreased efficiency and equipment damage are avoided by the method. Expensive and non-controllable chemical foam systems are eliminated by this invention.

By establishing a supply of foaming agent in solution with the first component, even distribution of the foaming agent is insured for mixing with the second curable component. This enables vastly superior control of curable foam dispensing in-line. It is considered unexpected that a component of a curable polymer may contain solubilized gas or liquid foaming agent for mixing at a dispensing head with the second component having no foaming agent for effective foam formation upon dispensing. These advantages, as well as others, will be appreciated in light of the following detailed descriptions and drawings.

BRIEF DESCRIPTION OF THE DRAWINGS

The FIGURE is a diagrammatic depiction of an apparatus for use in the present invention.

DETAILED DESCRIPTION

The present invention is useful for applying foamed multi-component curable or thermosetting resins. The terms "curable" or "cured" resins or polymers are used herein to cover all such chemically reacting materials whether by vulcanizing, cross-linking, thermosetting, or the like. A multi-component thermosetting resin is one wherein at least two resinous components react with each other forming a thermosetting material. Specifically excluded are chemically foaming thermosetting resins wherein the curing reaction generates substantial gas. As the primary blowing agent these systems lack the ability of control. Of course, many thermosetting reactions generate minor amounts of gas, i.e., on the order of about 10% by volume. This small amount of gas is not considered significant or detrimental to the objectives of this invention. Therefore, thermosetting resins which generate such small amounts of gas by volume are useful in the present invention inasmuch as they are considered non-chemically foamed.

Exemplary of such thermosetting materials are multi-component epoxy systems, multi-component polyurethane systems, multi-component silicone systems, saturated and unsaturated polyesters including alkyds and other polyesters; nylons and other polyamides; polyesteramides, chlorinated polyethers, cellulose esters such as cellulose acetate butyrate, and the like.

In particular, the present invention can be used with a variety of foam generating two-component polymer systems. RTV (room temperature vulcanizing) silicone rubbers which are formed by the addition of silicon hydride to an olefin can be used. In practice, the vinyl functional silicone polymers are reacted with hydride functional siloxanes. The hydride functional siloxane usually serves as the curing agent. The reaction proceeds at room temperature in the presence of a catalysts such as chloroplatinic acid or other solubilized platinum compound. The cure can be accelerated by elevated temperatures generally 50° to 100° C.

Two-component epoxy systems can also be employed in the present invention. These can be formed, for example, when the first component is a diglicidyl ether of bisphenol A reacted with a second component such as epichlorohydrin in the presence of a catalyst such as an amine, polyamide, hydride or the like.

Urethanes can also be employed in the present invention involving a cure without liberation of a substantial amount foaming agent. One particular urethane system is the Pliogrip 6600 system sold by Ashland Chemical Company which has, on a percent by weight basis, a first component formed from 43-47% polyurethane polymer in combination with 20-25% diphenylmethane diisocyanate, 2-5% talc and 5-10% methylenephenylene isocyanate oligimer. The second component is Pliogrip 6620 which is the curing system formed from a 85-90% polyol, 5-10% silica, 5-10% urethane polymer and 1-5% amine. The foaming and curing of this system is described in the following detailed example below, which is described with reference to the FIGURE.

Many different blowing agents can be used to practice the present invention. For example, gaseous blowing agents including inert gases such as nitrogen, helium, argon, neon and carbon dioxide can be used as well as fluorinated hydrocarbons, ethane, butane, propane, and air. Such blowing agents can be varied according to the types of compositions which are foamed. Gaseous agents are preferred to ensure better mixing and foaming control. The advantages of the invention are secured by foaming non-chemically foamed systems to differentiate from the chemically foamed systems that are expensive and lack effective control.

Preferably the foaming agent will be combined with one component at the supply source of the component and maintained as a stable dispersion or solution of foaming agent in the component. Throughout this specification and claims the term "solution" is used to describe the liquid polymer containing a dissolved gas supplied under high pressure to the dispensing device, which creates a foamed polymeric structure when dispensed at atmospheric pressure. The term "solution" as used in the specification and the claims of the application is intended to define and encompass the broader generic definition of solution which is a homogeneous mixture of a gas and a molten or liquid polymer, whether or not the gas molecules are in fact dissolved or dispersed among the polymer molecules.

Preferably, a supply of one component of the thermosetting resin under pressure and in solution with a gaseous blowing agent is used. The blowing agent is mixed at elevated pressure with this first component to dissolve the blowing agent in the first component. By providing a supply having a solution of the foaming agent in one of the components, the amount of foaming agent can be carefully controlled by the methods and apparatus disclosed in U.S. Pat Nos. 4,779,762 and 4,778,631; and the disclosures of these patents are incorporated herein by reference. This is in comparison to adding the foaming agent in a supply line or the like where the amount of foaming agent that actually passes into the supply line as well as the degree of mixing cannot be properly controlled.

The ratio of volume occupied after foaming to volume occupied before foaming of the thermosetting composition of the present invention, can vary over a broad range depending on the intended end use of the composition.

The first component including the blowing agent is combined with the other components at a mixing station immediately prior to the dispensing nozzle. The mixing apparatus merely needs to be sufficient to blend the first component with the second component. Since the first component already has the blowing agent uniformly distributed throughout, required mixing is minimized. The mixing apparatus itself can be, for example, an in-line static mixer. Since minimal mixing is required and it is in close proximity to the dispensing orifice, the chances of a set up occurring are substantially reduced or eliminated.

After mixing the mixed multi-component thermosettable resin is dispensed from a nozzle orifice. Upon emerging from the outlet nozzle or orifice of the dispenser the gas evolves from the solution in the form of small bubbles which enlarge causing the polymer material to expand volumetrically. The resultant product in an uncompressed state becomes a homogeneous foam having gas pores or cells which may be of various forms including both open and closed cells, substantially evenly distributed throughout the polymer. As the polymer material cools or cures a permanent homogeneous foam is created. The invention will be further appreciated in light of the following detailed example describing application of a two-component polyurethane system. The example also describes the use of the apparatus shown in the FIGURE.

EXAMPLE

A two-component foamed adhesive is formed using Ashland Chemical series 6600 pliogrip polyurethane. The system is a two-component system where the first component is a polyurethane resin number 6600 with curing component number 6620 as defined in detail above. The mix ratio is 4:1 by weight resin to curing component.

With reference to the FIGURE, the resin 10 (resin 6600) was placed in a batch mixer 11 having rotary mixing blades or disks 12 powered by mixer motor 14. The disks 12 serve to divide mixer 11 into a series of compartments along its length. The mixer shown in FIGS. 5-7 of U.S. Pat. No. 4,778,631 provides greater detail of an acceptably preferred apparatus and such is incorporated herein by reference; a pump may be used as shown in such detail to force feed the first component solution with gas to static mixer 24. Other alternative means for mixing gas to form a solution may be used such as disclosed in U.S. Pat. No. 4,779,762 and this disclosure is incorporated herein by reference. Alternatively, pressurized gas foaming agent may be used from a supply tank for solubilization in the curable composition. Thus, with reference to the FIGURE, nitrogen from tank 15 was introduced through valve 16 at 500 psig. The blades are rotated at 100 rpm for 15 minutes in a direction which forced the mixture downwardly. The curing component, i.e., MDI catalyst was added to reaction vessel 18 which was pressurized to 500 psid without mixing. Specifically, gas from tank 15 was introduced through line 19 controlled by valve 21.

Resin 10 flowed from vessel 11 through line 22 and valve 23 (¼ NPT regulating shut off valve) into a static mixer 24. The static mixer is a 0.250 inch by 11.0 inch tube with 18 mixing elements. Flow of the curing component 17 was then started from vessel 18 through line 25 through valve 26. The resin (6620) 10 from vessel 11 then mixed with the curing component 17 from vessel 18 in the static mixing tube 24. The mixing tube terminates with a discharge port 20. Samples discharged through port 20 after cure showed a very good foam quality and density reductions of approximately 50%.

This apparatus can be modified to provide for recirculation of either resin 10 or curing component 17. Specifically, a return line 31 is added (shown in dotted lines) from valve 23 to vessel 11. Valve 23 would be a valve with return bypass. Likewise, a return line 32 (in dotted line) can be added extending from vessel 18 to valve 26.

By adding the foaming agent to only one component of a two-component system, the density of the formed foam can be precisely controlled. Since one component includes the foaming agent, which can reduce viscosity, mixing of the two components of the polymer is sometimes improved. Since a uniform supply of blowing agent dissolved in the resin is formed, the blowing agent will be uniformly dispersed throughout the thermosetting resin after the two components are combined. As previously stated, since the two components are combined at the outlet port or orifice, the chances of premature curing are substantially reduced but adequate mixing is still attained for curable foam formation. Further if such a premature curing were to occur clean up would be relatively easy limited to the mixer and the outlet orifice or spray apparatus.

The preceding has been a description of the present invention as well as a description of the preferred embodiment of practicing the invention. However, the scope of the invention itself should be defined only by the appended claims.

What is claimed is:

1. A method of dispensing a foamable two-component thermosetting polymer composition comprising
   providing a supply of a first component of said two-component thermosetting polymer containing a gas foaming agent under pressure in solution;
   providing a second source of supply for a second component of said two-component thermosetting polymer system without a foaming agent, and
   mixing said first component with said second component from said sources in-line at a dispensing head for dispensing at atmospheric pressure the thermosetting foam mixture.

2. The method claimed in claim 1 wherein said polymer composition is selected from the group consisting of polyurethane, silicone and epoxy polymers.

3. The method claimed in claim 1 wherein said foaming agent is selected from the group consisting of nitrogen, carbon dioxide, air and helium.

4. A method of dispensing a non-chemically foamed multi-component curable polymer composition comprising
   providing a source of supply for a first component of said multi-component curable polymer composition;
   providing a second source of supply of a second component of said multi-component curable polymer composition;
   introducing a foaming agent into said first component and forming a solution of said foaming agent in said first component at said source of supply for said first component and thereafter mixing said solution with said second component immediately prior to a dispensing port and discharging a foamed mixture from said dispensing port.

5. The method claimed in claim 4 wherein said source of supply maintains a uniform stable solution of said foaming agent in said first component.

6. An apparatus for dispensing a non-chemically foamed multi-component curable polymer comprising
   a first supply source for a first component of said multi-component curable polymer for forming a solution of a gas foaming agent under pressure in said first component,
   an outlet line leading from said first supply source to a mixer,
   a second supply source for a second component of said multi-component polymer without a foaming agent,
   an outlet line leading from said second supply source to said mixer,
   a dispensing head connected at an outlet of said mixer for dispensing said curable polymer foam at atmospheric pressure,
   means for supplying said components under pressure through said lines to said mixer for controllably dispensing said curable polymer foam through said dispensing head and
   means to recirculate said first component from a point upstream of said mixer to said first supply source.

7. The apparatus of claim 6 wherein said first supply source includes an agitating means to assist in formation of a solution.

8. An apparatus for dispensing a non-chemically foamed multi-component curable polymer comprising
   a first supply source for a first component of said multi-component curable polymer for forming a solution of a gas foaming agent under pressure in said first component,
   an outlet line leading from said first supply source to a mixer,
   a second supply source for a second component under pressure of said multi-component polymer without a foaming agent,
   an outlet line leading from said second supply source to said mixer,
   a dispensing head connected at an outlet of said mixer for dispensing said curable polymer foam at atmospheric pressure,
   means for supplying said components under pressure through said lines to said mixer for controllably dispensing at atmospheric pressure said curable polymer foam through said dispensing head, and
   means to recirculate said second component from a point upstream of said mixer to said second supply source.

9. An apparatus for dispensing a non-chemically foamed multi-component curable polymer comprising
   a first supply source for a first component of said multi-component curable polymer for forming a solution of a gas foaming agent under pressure in said first component,
   an outlet line leading from said first supply source to a mixer,
   a second supply source for a second component under pressure of said multi-component polymer without a foaming agent,
   an outlet line leading from said second supply source to said mixer,
   a dispending head connected at an outlet of said mixer for dispensing said curable polymer foam at atmospheric pressure, and
   means for supplying said components under pressure through said lines to said mixer for controllably dispensing at atmospheric pressure said curable polymer foam through said dispensing head.

10. An apparatus for dispensing a non-chemically foamed multi-component curable polymer comprising
    a first supply source for a first component of said multi-component curable polymer for forming a solution of a gas foaming agent under pressure in said first component,
    an outlet line leading from said first supply source to a mixer,
    a second supply source for a second component under pressure of said multi-component polymer without a foaming agent,
    an outlet line leading from said second supply source to said mixer,
    a dispensing head connected at an outlet of said mixer for dispensing said curable polymer foam at atmospheric pressure,
    means for supplying said components under pressure through said lines to said mixer for controllably dispensing at atmospheric pressure said curable polymer foam through said dispensing head, and
    said first supply source for forming said solution comprising:
    (a) at least one rotatable shaft including a first series of spaced disks substantially perpendicular to the axis thereof and rotatable therewith about said axis,
    (b) a housing surrounding said shaft and disks,
    (c) said disks serving to divide said housing into a series of compartments along its length,
    (d) inlet means for said first component at one end of said housing,
    (e) outlet means for said first component at the other end of said housing,
    (f) means for introducing a gas into said housing,
    (g) means for driving said rotatable shaft to cause said disks to rotate to cause mixing of said gas with said first component within said housing to form said solution upstream of said solution outlet means, and
    (h) means for maintaining said gas in solution.

11. The apparatus of claim 10 further comprising a pump for force feeding said inlet means with said first component into and through said housing.

* * * * *